United States Patent
Zhan et al.

(10) Patent No.: US 10,826,122 B2
(45) Date of Patent: Nov. 3, 2020

(54) LITHIUM-ION BATTERY

(71) Applicant: CONTEMPORARY AMPEREX TECHNOLOGY CO., LIMITED, Ningde (CN)

(72) Inventors: Yingjie Zhan, Ningde (CN); Jian Yan, Ningde (CN); Songjun Shi, Ningde (CN); Lan Xie, Ningde (CN); Wenhao Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 279 days.

(21) Appl. No.: 15/981,716

(22) Filed: May 16, 2018

(65) Prior Publication Data
US 2018/0351209 A1    Dec. 6, 2018

(30) Foreign Application Priority Data

May 31, 2017  (CN) .......................... 2017 1 0398000

(51) Int. Cl.
| | |
|---|---|
| *H01M 10/0567* | (2010.01) |
| *H01M 10/0525* | (2010.01) |
| *H01M 10/0568* | (2010.01) |
| *H01M 10/0569* | (2010.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ....... *H01M 10/0567* (2013.01); *H01M 4/366* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 2004/028* (2013.01); *H01M 2300/004* (2013.01)

(58) Field of Classification Search
CPC .. H01M 10/0567; H01M 4/366; H01M 4/505; H01M 4/525; H01M 10/0569; H01M 10/0568; H01M 10/0525; H01M 2004/028; H01M 2300/004; H01M 4/628; H01M 4/5825; H01M 4/38
See application file for complete search history.

(56) References Cited

U.S. PATENT DOCUMENTS

| | | | | |
|---|---|---|---|---|
| 2013/0323598 A1* | 12/2013 | Liu | ........................ | H01M 4/505 429/223 |
| 2015/0311522 A1* | 10/2015 | Fang | ...................... | H01M 4/485 429/220 |
| 2016/0013471 A1* | 1/2016 | Kaseda | .................. | H01M 4/131 429/223 |
| 2018/0316015 A1* | 11/2018 | Lee | ........................ | C01G 51/42 |

FOREIGN PATENT DOCUMENTS

| | | |
|---|---|---|
| CN | 102593512 A | 7/2012 |
| CN | 106159244 A | 11/2016 |
| JP | 6588965 | * 10/2019 |

\* cited by examiner

*Primary Examiner* — Muhammad S Siddiquee
(74) *Attorney, Agent, or Firm* — Morgan, Lewis & Bockius LLP

(57) ABSTRACT

The present disclosure provides a lithium-ion battery, which comprises: a positive electrode plate containing a positive electrode active material, a negative electrode plate containing a negative electrode active material and an electrolyte. The positive electrode active material comprises: a core and a coating layer coating a surface of the core and comprising boron. The electrolyte comprises a lithium salt, a non-aqueous organic solvent and an electrolyte additive, the electrolyte additive comprises an organic titanium compound. The coating layer of the positive electrode active material of the lithium-ion battery according to the present disclosure contains boron, and the electrolyte of the lithium-ion battery contains the organic titanium compound, under the combined effect of the coating layer containing boron and the electrolyte containing the organic titanium compound, the lithium-ion battery has excellent high temperature cycle performance and excellent high temperature storage performance.

14 Claims, No Drawings

LITHIUM-ION BATTERY

CROSS-REFERENCE TO RELATED APPLICATIONS

The present application claims priority to Chinese patent application No. CN2017/10,398,000.5, filed on May 31, 2017, which is incorporated herein by reference in its entirety.

FIELD OF THE PRESENT DISCLOSURE

The present disclosure relates to the field of battery, and more specifically relates to a lithium-ion battery.

BACKGROUND OF THE PRESENT DISCLOSURE

In recent years, a lithium-ion battery in fields of EV, HEV, energy storage device and the like has shown excellent prospects for application, and has become a favorite of these fields. With the expansion of market demand for electronic products, as well as the development of power device and energy storage device, the demand for energy density of lithium-ion battery has also been increasing. Therefore, it is imperative to develop a lithium-ion battery with high energy density.

The development of a positive electrode active material of the lithium-ion battery with higher voltage or higher discharge specific capacity has been a hot topic in recent years. However, when the voltage of the lithium-ion battery is further increased or the discharge specific capacity is further increased, the stability of the positive electrode active material becomes a crucial issue, and the side reaction of the positive electrode active material with the electrolyte is further aggravated, the electrochemical performance of the lithium-ion battery will be serious deteriorated. In order to improve the electrochemical performance of the lithium-ion battery under high voltage or high discharge specific capacity, more and more researchers are devoted to the modification of the positive electrode active material. Currently, the positive electrode active material used in power lithium-ion battery mainly includes lithium iron phosphate, ternary materials (NCM/NCA). The ternary lithium nickel cobalt manganese (NCM) material has attracted a great deal of attention due to its high capacity (up to 250 mAh/g, 91% of the theoretical capacity), safety and low cost. However, for the power lithium-ion battery, no high temperature swelling with a long cycle life is the key indicator, that the ternary lithium nickel cobalt manganese (NCM) materials cannot take account of high temperature storage performance and cycle performance is the bottle neck to use in the field of power lithium-ion battery. At present, bulk doping and surface coating are mainly two methods of modification of the ternary lithium nickel cobalt manganese (NCM) material, including the use of some transition metal oxides or nontransition metal oxides for doping the positive active material and coating a layer of inert metal oxide on the surface of the active material. However, when the positive active material precursor is coated, there often exists a case that the active site is not completely covered, and the rapid decline of the capacity of the positive active material cannot be prevented.

Therefore, there is an urgent need to provide a technical method to make the positive active material stable during the long-term cycle so as to improve high-temperature storage performance and the cycle life of the lithium-ion battery.

SUMMARY OF THE PRESENT DISCLOSURE

In view of the problem existing in the background, an object of the present disclosure is to provide a lithium-ion battery, a coating layer of a positive electrode active material of the lithium-ion battery contains boron, and an electrolyte of the lithium-ion battery contains an organic titanium compound, under the combined effect of the coating layer containing boron and the electrolyte containing the organic titanium compound, the lithium-ion battery has excellent high temperature cycle performance and excellent high temperature storage performance.

In order to achieve the above object, the present disclosure provides a lithium-ion battery, which comprises: a positive electrode plate containing a positive electrode active material, a negative electrode plate containing a negative electrode active material and an electrolyte. The positive electrode active material comprises: a core and a coating layer coating a surface of the core and comprising boron. The electrolyte comprises a lithium salt, a non-aqueous organic solvent and an electrolyte additive. The electrolyte additive comprises an organic titanium compound. The organic titanium compound is one or more selected from a group consisting of compounds represented by formula 1, formula 2, formula 3, formula 4 and formula 5; where, $R_1$, $R_2$, $R_3$, $R_4$, $R_5$, $R_6$, $R_7$, $R_{11}$, $R_{12}$, $R_{13}$ and $R_{14}$ each independently are one selected from C1~C12 alkyl group substituted or unsubstituted with one or more substituent group, C1~C12 hydroxyalkyl group substituted or unsubstituted with one or more substituent group, C2~C12 alkenyl group substituted or unsubstituted with one or more substituent group, C2~C12 alkynyl group substituted or unsubstituted with one or more substituent group, C1~C12 sulfonyl substituted or unsubstituted with one or more substituent group, and metal ion; $R_8$, $R_9$ and $R_{10}$ each independently are one selected from C1~C12 alkyl group substituted or unsubstituted with one or more substituent group, C2~C12 alkenyl group substituted or unsubstituted with one or more substituent group, C2~C12 alkynyl group substituted or unsubstituted with one or more substituent group, and halogen; $R_{21}$, $R_{22}$, $R_{23}$, $R_{24}$, $R_{25}$, $R_{26}$, $R_{27}$ and $R_{28}$ each independently are one selected from C1~C6 alkyl group substituted or unsubstituted with one or more substituent group and C1~C6 sulfonyl substituted or unsubstituted with one or more substituent group,

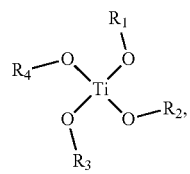

formula 1

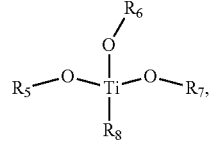

formula 2

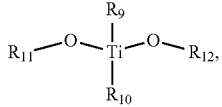

formula 3

-continued

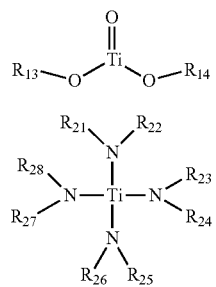

formula 4 formula 5

Compared to the technologies in the background, the present disclosure has the following beneficial effects: the coating layer of the positive electrode active material of the lithium-ion battery according to the present disclosure contains boron, and the electrolyte of the lithium-ion battery contains the organic titanium compound, under the combined effect of the coating layer containing boron and the electrolyte containing the organic titanium compound, the lithium-ion battery has excellent high temperature cycle performance and excellent high temperature storage performance.

DETAILED DESCRIPTION

Hereinafter a lithium-ion battery according to the present disclosure is described in detail.

Firstly, a lithium-ion battery according to a first aspect of the present disclosure is described.

The lithium-ion battery according to the first aspect of the present disclosure comprises: a positive electrode plate containing a positive electrode active material, a negative electrode plate containing a negative electrode active material and an electrolyte. The positive electrode active material comprises a core and a coating layer. The coating layer coats a surface of the core and contains boron. The electrolyte comprises a lithium salt, a non-aqueous organic solvent and an electrolyte additive. The electrolyte additive comprises an organic titanium compound. The organic titanium compound is one or more selected from a group consisting of compounds represented by formula 1, formula 2, formula 3, formula 4, and formula 5. Where, $R_1$, $R_2$, $R_3$, $R_4$, $R_5$, $R_6$, $R_7$, $R_{11}$, $R_{12}$, $R_{13}$ and $R_{14}$ each independently are one selected from a group consisting of C1~C12 alkyl group substituted or unsubstituted with one or more substituent group, C1~C12 hydroxyalkyl group substituted or unsubstituted with one or more substituent group, C2~C12 alkenyl group substituted or unsubstituted with one or more substituent group, C2~C12 alkynyl group substituted or unsubstituted with one or more substituent group, C1~C12 sulfonyl substituted or unsubstituted with one or more substituent group, and metal ion; $R_8$, $R_9$ and $R_{10}$ each independently are one selected from a group consisting of C1~C12 alkyl group substituted or unsubstituted with one or more substituent group, C2~C12 alkenyl group substituted or unsubstituted with one or more substituent group, C2~C12 alkynyl group substituted or unsubstituted with one or more substituent group, and halogen; $R_{21}$, $R_{22}$, $R_{23}$, $R_{24}$, $R_{25}$, $R_{26}$, $R_{27}$ and $R_{28}$ each independently are one selected from a group consisting of C1~C6 alkyl group substituted or unsubstituted with one or more substituent group and C1~C6 sulfonyl substituted or unsubstituted with one or more substituent group,

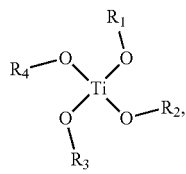

formula 1

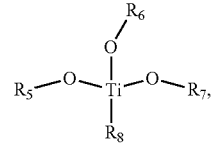

formula 2

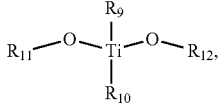

formula 3 formula 4

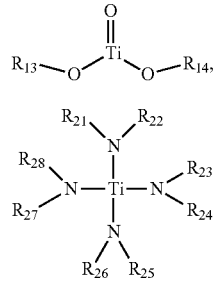

formula 5

In the lithium-ion battery according to the first aspect of the present disclosure, in the positive electrode active material, on one hand, boron of the coating layer of the positive electrode active material has excellent diffusion ability of lithium ions, which can reduce DCR of the lithium-ion battery and improve power performance of the lithium-ion battery, meanwhile improve first coulombic efficiency of the positive electrode active material, thereby improving capacity of the lithium-ion battery and improving electrochemical performance of the lithium-ion battery to a certain extent; on the other hand, boron of the coating layer can also interact with transition metal (such as nickel, cobalt, manganese, and etc.) of the core of the positive electrode active material via electronic complexation to stabilize crystal structure of the positive electrode active material and reduce dissolving-out of the transition metal, thus further improve power performance, high temperature cycle performance and high temperature storage performance of the lithium-ion battery. For the electrolyte, in structure of the organic titanium compound which is added as the electrolyte additive, elements connected with the titanium are all electron-rich oxygen or nitrogen, when voltage is at a high level (higher than 3.8V), electrochemical oxidation of the organic titanium compound easily occurs on a surface of the positive electrode plate under high voltage (higher than 3.8V), electrochemical deposition of the organic titanium compound occurs on the surface of the positive electrode plate to form a titanium-containing layer, which uniformly coats active site of the positive electrode active material, thereby inhibiting corrosion of the positive electrode active material by the electrolyte, more specifically inhibiting the corrosion of the coating layer, further alleviating dissolving-out of the transition metal of the positive electrode active material, and preventing the crystal structure of the positive electrode active material from collapsing, so as to achieve the object of further improving electrochemical performance of the lithium-ion battery. Therefore, the lithium-ion battery of the present disclosure shows excellent high temperature cycle performance and high temperature storage performance under the combined effect of the positive electrode active material containing the boron-containing coating layer and the electrolyte containing the organic titanium compound.

In the lithium-ion battery according to the first aspect of the present disclosure, the substituent group is one or more selected from a group consisting of halogen atom and oxygen atom.

In the lithium-ion battery according to the first aspect of the present disclosure, the core may be one or more selected from a group consisting of lithium iron phosphate (LiFePO$_4$), lithium cobalt oxide, lithium nickel oxide, lithium manganese oxide, lithium nickel manganese oxide, lithium nickel cobalt manganese oxide, lithium nickel cobalt aluminium oxide and compounds obtained by adding transition metal element or non-transition metal element to the above oxides; preferably, the core may be one or more selected from a group consisting of lithium cobalt oxide (LiCoO$_2$), lithium manganese phosphate (LiMn$_2$O$_4$), lithium iron phosphate (LiFePO$_4$) and nickel cobalt manganese metal oxide (NCM); preferably, the core may be one or more selected from LiNi$_{1/3}$Co$_{1/3}$Mn$_{1/3}$O$_2$, LiNi$_{0.5}$Co$_{0.2}$Mn$_{0.3}$O$_2$, LiNi$_{0.6}$Co$_{0.2}$Mn$_{0.2}$O$_2$ and LiNi$_{0.8}$Co$_{0.1}$Mn$_{0.1}$O$_2$.

In the lithium-ion battery according to the first aspect of the present disclosure, the core of the positive electrode active material includes a large particle core and a small particle core, where, a particle size of the large particle core may range from 10 μm to 14 μm, a particle size of the small particle core may range 3 μm to 6 μm, the combination of the large particle core and the small particle core can not only improve compaction density of the positive electrode active material but also increase wettability caused by capillarity from the electrolyte to the positive electrode plate. It should be notice that, the particle size here means D50.

In the lithium-ion battery according to the first aspect of the present disclosure, in the core of the positive electrode active material, a weight ratio of the large particle core to the small particle core may be (5~9):(1~5), the combination of the large particle core and the small particle core in this range can further improve compaction density of the positive electrode active material, thereby improving energy density of the lithium-ion battery.

In the lithium-ion battery according to the first aspect of the present disclosure, the core contains nickel from one or more selected from a group consisting of lithium nickel oxide, lithium nickel manganese oxide, lithium nickel cobalt manganese oxide, lithium nickel cobalt aluminium oxide and compounds obtained by adding transition metal element or non-transition metal element to the above oxides, a content of nickel of the large particle core is greater than or equal to a content of nickel of the small particle core, since a total specific surface area of the small particle core which is alone acted as the core is greater than a total specific surface area of the large particle core which is alone acted as the core in the positive electrode active material, therefore by controlling the content of nickel of the large particle core to be greater than or equal to the content of nickel of the small particle core, it is possible to reduce the contact probability of nickel of the positive electrode active material with the electrolyte, thereby reducing side reactions between the electrolyte and the positive electrode active material, reducing DCR of the lithium-ion battery, improving power performance of the lithium-ion battery. Preferably, the content of nickel of the large particle core is greater than the content of nickel of the small particle core.

In the lithium-ion battery according to the first aspect of the present disclosure, the coating layer is selected from B$_2$O$_3$. B$_2$O$_3$ has a higher diffusion ability of the lithium ions compared with other materials containing boron, which is more beneficial to improve DCR and power performance of the lithium-ion battery.

In the lithium-ion battery according to the first aspect of the present disclosure, a content of the coating layer is 0.01%~0.2% of a total weight of the positive electrode active material. If the content of the coating layer is too high, processing performance of the positive electrode active material becomes worse, high temperature storage performance of the lithium-ion battery also becomes worse; if the content of the coating layer is too low, performance of the lithium-ion battery cannot be improved. Preferably, the content of the coating layer may be 0.02%~0.1% of the total weight of the positive electrode active material.

In the lithium-ion battery according to the first aspect of the present disclosure, the organic titanium compound may be one or more selected from a group consisting of tetrabutyl titanate, titanium ethoxide, titanium propoxide, titanium diisopropoxide bis(acetylacetonate), titanium tetraisopropanolate, tetra-tert-butyl orthotitanate, butyl isopropyl titanate, titanium isobutoxide, tetra(3-hydroxypropoxy) titanate, titanium(IV)oxide acetylacetonate, tetrakis(2,4-pentanedionato)titanium(IV), titanocene bis(trifluoromethanesulfonate), dichlorotitanium diisopropoxide, titanium dichloride diethoxide, iodotriisopropyl titanate and tetrakis(dimethylamino)titanium, where, a molecular formula of each material is represented as follow.

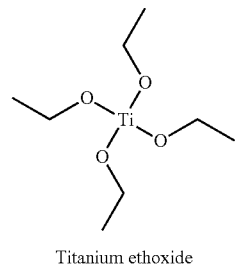

Titanium ethoxide

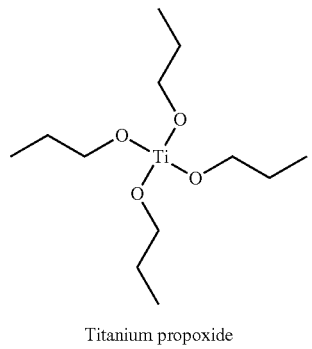

Titanium propoxide

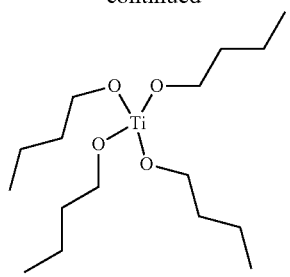

Tetrabutyl titanate

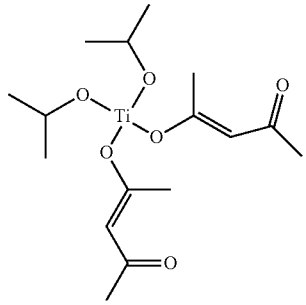

Titanium diisopropoxide
bis(acetylacetonate)

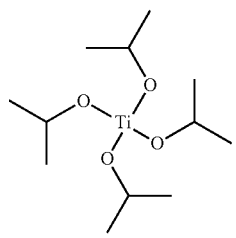

Titanium tetraisopropanolate

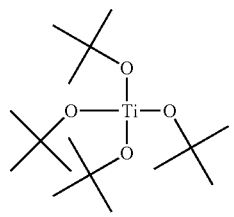

Tetra-tert-butyl orthotitanate

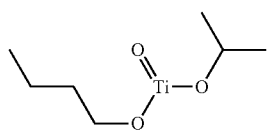

Butyl isopropyl titanate

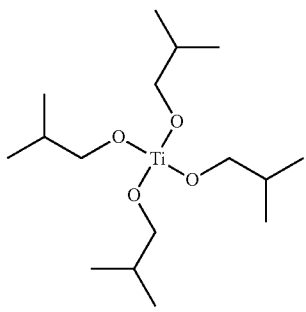

Titanium isobutoxide

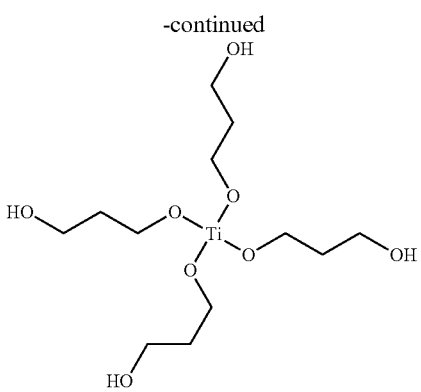

Tetra(3-hydroxypropoxy) titanate

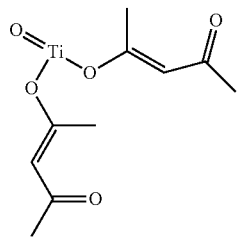

Titanium(IV)oxide acetylacetonate

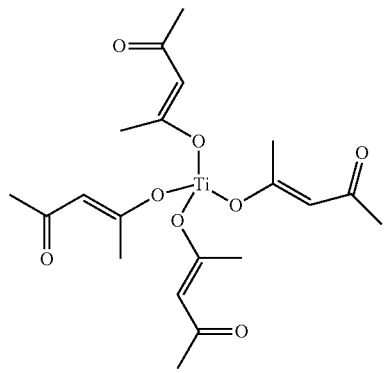

Tetrakis(2,4-pentanedionato)
titanium(IV)

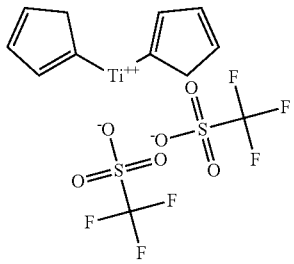

Titanocene
bis(trifluoromethanesulfonate)

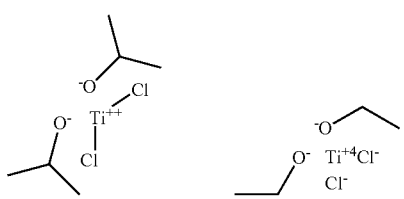
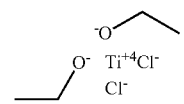

Dichlorotitanium
diisopropoxide

Titanium
dichloride diethoxide

-continued

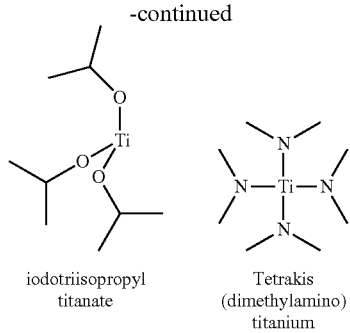

iodotriisopropyl titanate

Tetrakis (dimethylamino) titanium

In the lithium-ion battery according to the first aspect of the present disclosure, a content of the organic titanium compound is 0.001%~0.5% of a total weight of the electrolyte. If the content of the organic titanium is too low, the organic titanium compound is insufficient to perform electrochemical deposition effectively under high voltage; if the content of the organic titanium is too high, the lithium-ion battery will be swelled when it is stored under high temperature, it occurs because the organic titanium compound is inherently difficult to dissolve. Preferably, the content of the organic titanium compound is 0.001%~0.1% of the total weight of the electrolyte.

In the lithium-ion battery according to the first aspect of the present disclosure, a type of the non-aqueous organic solvent is not particularly limited as long as it does not contain active hydrogen and is polar. Specifically, the non-aqueous organic solvent may be one or more selected from a group consisting of ethylene carbonate, propylene carbonate, dimethyl carbonate, ethyl methyl carbonate, diethyl carbonate, methyl propyl carbonate, δ-valerolactone, methyl formate, ethyl formate, methyl acetate, ethyl acetate, propyl acetate, ethyl propionate, methyl butyrate, butyl formate, propyl propionate, ethyl butyrate, butyl acetate, methyl valerate, amyl formate, trimethylene sulfate, ethyl methyl sulfate, tetrahydrofuran, 1,3-dioxolane, 1,3-dioxane, dimethoxymethane, diethoxymethane, 1,2-dimethoxyethane and ethylene glycol diethyl ether. Moreover, the non-aqueous organic solvent used in the present disclosure may be only one type according to the purpose or may two or more types mixed together by arbitrary combination according to purpose. From the practical and commercial point of view, optimally, non-aqueous organic solvent includes carbonate ester and carboxylate ester.

In the lithium-ion battery according to the first aspect of the present disclosure, the electrolyte additive further comprises one or more selected from a group consisting of maleic anhydride, vinylene carbonate, 4-Vinyl-1,3-dioxolan-2-one, 4-Fluoro-1,3-dioxolan-2-one, γ-butyrolactone, dimethyl sulfite, diethyl sulfite, glycol sulfite, propyl sulfite, vinylidene sulfite, sulfolane, cyclopentyl sulfone, tetramethylene sulfoxide, cyclopentyl sulfoxide, dimethyl sulfoxide, methyl ethyl sulfoxide, diethyl sulfoxide, methyl sulfone, methyl ethyl sulfone, diethyl sulfone, divinyl sulphone, methyl methanesulfonate, ethyl methanesulfonate, propargyl methanesulfonate, methyl benzenesulfonate, 1,3-propanesultone, 1,4-butane sultone, dimethyl sulfate, diethyl sulfate, ethylene sulfate, 1,2-propanediol sulfate and prop-1-ene-1,3-sultone. Here, maleic anhydride, vinylene carbonate, 4-Vinyl-1,3-dioxolan-2-one, 4-Fluoro-1,3-dioxolan-2-one and γ-butyrolactone can form a film on the negative electrode plate, effectively inhibiting reactions between the negative electrode and the electrolyte, improving high temperature cycle performance and high temperature storage performance of the lithium-ion battery, while dimethyl sulfite, diethyl sulfite, glycol sulfite, propyl sulfite, vinylidene sulfite, sulfolane, cyclopentyl sulfone, tetramethylene sulfoxide, cyclopentyl sulfoxide, dimethyl sulfoxide, methyl ethyl sulfoxide, diethyl sulfoxide, methyl sulfone, methyl ethyl sulfone, diethyl sulfone, divinyl sulphone, methyl methanesulfonate, ethyl methanesulfonate, propargyl methanesulfonate, methyl benzenesulfonate, 1,3-propanesultone, 1,4-butane sultone, dimethyl sulfate, diethyl sulfate, ethylene sulfate, 1,2-propanediol sulfate and prop-1-ene-1,3-sultone usually can form a film on the surface of both positive and negative electrode plates, in combination with the organic titanium compound, the CEI (cathode electrolyte interface) film can cover the surface the positive electrode plate completely, effectively inhibiting the dissolving-out of transition metal of the positive electrode active material, reducing the side reactions between the electrolyte and the positive electrode plate, as a result, organic acid of the electrolyte may be difficult to react with the positive electrode active material, even under high temperature, the lithium-ion battery will not rapidly fail due to the corrosion of the organic acid.

In the lithium-ion battery according to the first aspect of the present disclosure, a type of the lithium salt is not particularly limited, and may be an organic lithium salt or an inorganic lithium salt. Specifically, the lithium salt may contain one or more selected from a group consisting of fluorine, boron and phosphorus. Preferably, the lithium salt is one or more selected from a group consisting of lithium hexafluorophosphate (LiPF$_6$), lithium tetrafluoroborate (LiBF$_4$), lithium perchlorate (LiClO$_4$), lithium hexafluoroarsenate (V) (LiAsF$_6$), lithium tetrafluoro (oxalate) phosphoric (LiTFOP), LiN(SO$_2$RF)$_2$, LiN(SO$_2$F)(SO$_2$RF), lithium bis(trifluoromethanesulphonyl)imide (LiN(CF$_3$SO$_2$)$_2$, abbreviated as LiTFSI), imidodisulfuryl fluoride lithium salt (Li(N(SO$_2$F)$_2$, abbreviated as LiFSI), lithium bis(oxalate)borate (LiB(C$_2$O$_4$)$_2$, abbreviated as LiBOB) and lithium difluoro(oxalato)borate(1−) (LiBF$_2$(C$_2$O$_4$), abbreviated as LiDFOB), where, substituent group represents R$_F$=—C$_n$F$_{2n+1}$, that is RF represents saturated alkyl group, n is an integer of 1~10. Further preferably, the lithium salt is one or two selected from LiPF$_6$ and LiN(SO$_2$R$_F$)$_2$.

In the lithium-ion battery according to the first aspect of the present disclosure, a content of the lithium salt of the electrolyte ranges from 0.5M~2M (M=mol L$^{-1}$).

In the lithium-ion battery according to the first aspect of the present disclosure, the negative electrode active material may be one or more selected from a group consisting of graphite, silica-based material and tin-based material.

In the lithium-ion battery according to the first aspect of the present disclosure, the positive electrode plate and the negative electrode plate each further comprise a conductive agent and a binder. A type of the conductive agent and the binder is not limited and may be changed as desired.

In the lithium-ion battery according to the first aspect of the present disclosure, the lithium-ion battery further comprises a separator. A type of the separator is not limited and may be changed as desired. Specifically, the separator may be one or more selected from a group consisting of poly(ethylene) separator, polypropylene separator and polyvinylidene fluoride separator. The form of the separator may be one or more selected from a group consisting of mono-layer separator or multi-layer composite separator formed by one or more monolayer separator.

Next, a preparation method of the positive electrode active material according to a second aspect of the present disclosure will be described.

The preparation method of the positive electrode active material according to the second aspect of the present disclosure for preparing the positive electrode active material of the first aspect of the present disclosure comprises steps of: firstly, weighting a soluble salt of nickel, cobalt and manganese according to a mass ratio to form an aqueous solution, utilizing coprecipitation to obtain a precursor of a core; then mixing the obtained precursor and a lithium source, performing a first sintering process, obtaining the core; next mixing the obtained core and a boron source to perform a second sintering process, obtaining the positive electrode active material.

In the preparation method of the positive electrode active material according to the second aspect of the present disclosure, the soluble salt of nickel, cobalt and manganese is one or more selected from a group consisting of hydrochloride, sulfate and nitrate of nickel, cobalt, manganese, and a concentration of the soluble salt ranges from 4 mol/L to 8 mol/L.

In the preparation method of the positive electrode active material according to the second aspect of the present disclosure, the coprecipitator may be one or more selected from basic salt. Specifically, the coprecipitator may be one or more selected from a group consisting of potassium hydroxide, $NH_4HCO_3$ and $NaCO_3$.

In the preparation method of the positive electrode active material according to the second aspect of the present disclosure, the lithium source may be one or more selected from a group consisting of $Li_2CO_3$, LiOH and $LiNO_3$, the boron source may be one or more selected from a group consisting of $B_2O_3$, boronic acid and ammonium pentaborate.

In the preparation method of the positive electrode active material according to the second aspect of the present disclosure, during the first sintering process, a heating rate ranged from 2° C./min to 10° C./min is used to heat to 800° C.~960° C., a time of the first sintering process ranges from 10 h to 20 h; after the first sintering process, cooling to room temperature at a speed of 0.5° C./min~2° C./min is performed. Performing the first sintering process according to such a heating curve can reduce a content of Li remained in the product of the first sintering process and maintain perfection of crystal structure of the core of the positive electrode active material. Preferably, the heating rate ranges from 4° C./min to 6° C./min, further preferably, the heating rate is 5° C./min. Preferably, the time of the first sintering process ranges from 12 to 18 h, further preferably, the time of the first sintering process is 16 h. Preferably, cooling to room temperature at the speed of 0.8° C./min~1.5° C./min is performed after the first sintering process, more preferably, cooling to room temperature at the speed of 1° C./min is performed after the first sintering process.

In the preparation method of the positive electrode active material according to the second aspect of the present disclosure, a temperature of the second sintering process ranges from 500° C. to 800° C., a time of the second sintering process ranges from 4 h to 6 h.

Hereafter the present disclosure will be further described in detail in combination with examples. It should be noted that, the examples described in the present disclosure are only used for explaining the present disclosure, but are not intended to limit the present disclosure In the following example, the reagents, materials and instruments used are commercially available without special instructions.

Example 1

(1) Preparation of a positive electrode active material: firstly, nickel sulfate, cobalt sulfate and manganese sulfate according to a molar ratio were mixed to form a solution with a total concentration of 5 mol/L of metal ion, then hydroxide coprecipitation was used to respectively prepare the large particle core precursor and the small particle core precursor by controlling reaction time and pH; then the large particle core precursor and the small particle core precursor were respectively mixed with lithium source according to a ratio, sintering was performed at 900° C. for 14 h, the heating rate was 6° C./min, which was followed by cooling to room temperature at a speed of 1° C./min, the large particle core and the small particle core are respectively obtained after crushing, where, the core was $LiNi_{0.5}Co_{0.2}Mn_{0.3}O_2$, D50 of the large particle core was 11 µm, D50 of the small particle core was 4 µm; the large particle core and the small particle core were mixed by ball-milling for 1 h according to a weight ratio of 4:1, then boron source $B_2O_3$ was added, and then mixed by ball-milling for 2 h, these materials were loaded into a sagger, the heating rate was 6° C./min, and then sintering was performed at 700° C. for 5 h, the positive electrode active material was obtained, where, a content of the $B_2O_3$ coating layer was 0.1% of a total weight of the core.

(2) Preparation of a positive electrode plate: the obtained positive electrode active material, acetylene black (conductive agent) and polyvinylenedifluoride (binder) according to a weight ratio of 96:2:2 were mixed with 1-methyl-2-pyrrolidinone (solvent), after fully stirring and mixing, a uniform positive electrode slurry was obtained; then the positive electrode slurry was coated on an aluminum foil (positive electrode current collector), then after baking, cold pressing, the positive electrode plate was obtained.

(3) Preparation of a negative electrode plate: graphite (negative electrode active material), acetylene black (conductive agent), styrene-butadiene latex (binder) and sodium carboxymethyl cellulose (thickening agent) according to a weight ratio of 95:2:2:1 were mixed with deionized water, after fully stirring and mixing, a uniform negative electrode slurry was obtained; then the negative electrode slurry was coated on a copper foil (negative electrode current collector), then after baking, cold pressing, the negative electrode plate was obtained.

(4) Preparation of an electrolyte: in an argon atmosphere glove box, ethylene carbonate (EC), diethyl carbonate (DEC) and ethyl methyl carbonate (EMC) according to a mass ratio of 3:2:5 were mixed to obtain a mixture, then lithium hexafluorophosphate with a concentration of 1.0 mol/L was slowly added into the mixture, finally the electrolyte additive was added into the mixture, after uniformly stirring, an electrolyte was obtained, where, the electrolyte additive was titanium ethoxide, a content of titanium ethoxide was 0.1% of a total weight of the electrolyte.

(5) Preparation of a lithium-ion battery: the positive electrode plate, the separator, the negative electrode plate were laminated in order to make the separator separate the positive electrode plate from the negative electrode plate, then were wound to form an electrode assembly and placed in a package film, then the prepared electrolyte was injected, after vacuum packaging, standing-by, forming, shaping and capacity testing, the preparation of the lithium-ion battery was finished.

Example 2

The preparation process was the same as example 1, except that in the preparation of the electrolyte (step (4)), the electrolyte additive was butyl isopropyl titanate, a content of butyl isopropyl titanate was 0.1% of a total weight of the electrolyte.

Example 3

The preparation process was the same as example 1, except that in the preparation of the electrolyte (step (4)), the electrolyte additive was titanocene bis(trifluoromethanesulfonate), a content of titanocene bis(trifluoromethanesulfonate) was 0.1% of a total weight of the electrolyte.

Example 4

The preparation process was the same as example 1, except that in the preparation of the electrolyte (step (4)), the electrolyte additive was tetrakis(dimethylamino)titanium, a content of tetrakis(dimethylamino)titanium was 0.1% of a total weight of the electrolyte.

Example 5

The preparation process was the same as example 1, except that in the preparation of the electrolyte (step (4)), the content of titanium ethoxide was 0.001% of a total weight of the electrolyte.

Example 6

The preparation process was the same as example 1, except that in the preparation of the electrolyte (step (4)), the content of titanium ethoxide was 0.01% of a total weight of the electrolyte.

Example 7

The preparation process was the same as example 1, except that in the preparation of the electrolyte (step (4)), the content of titanium ethoxide was 0.2% of a total weight of the electrolyte.

Example 8

The preparation process was the same as example 1, except that in the preparation of the electrolyte (step (4)), the content of titanium ethoxide was 0.5% of a total weight of the electrolyte.

Example 9

The preparation process was the same as example 1, except that in the preparation of the positive electrode active material (step (1)), a content of the $B_2O_3$ coating layer was 0.01% of a total weight of the core.

Example 10

The preparation process was the same as example 1, except that in the preparation of the positive electrode active material (step (1)), a content of the $B_2O_3$ coating layer was 0.02% of a total weight of the core.

Example 11

The preparation process was the same as example 1, except that in the preparation of the positive electrode active material (step (1)), a content of the $B_2O_3$ coating layer was 0.20% of a total weight of the core.

Example 12

The preparation process was the same as example 1, except that in the preparation of the positive electrode active material (step (4)), besides the titanium ethoxide, the electrolyte additive further comprised 4-Fluoro-1,3-dioxolan-2-one (FEC), a content of 4-Fluoro-1,3-dioxolan-2-one (FEC) was 0.5% of a total weight of the electrolyte.

Example 13

The preparation process was the same as example 1, except that in the preparation of the positive electrode active material (step (4)), besides the titanium ethoxide, the electrolyte additive further comprised ethylene carbonate (VC), a content of ethylene carbonate (VC) was 0.5% of a total weight of the electrolyte.

Example 14

The preparation process was the same as example 1, except that in the preparation of the positive electrode active material (step (4)), besides the titanium ethoxide, the electrolyte additive further comprised 4-Vinyl-1,3-dioxolan-2-one (VEC), a content of 4-Vinyl-1,3-dioxolan-2-one (VEC) was 0.5% of a total weight of the electrolyte.

Example 15

The preparation process was the same as example 1, except that in the preparation of the positive electrode active material (step (4)), besides the titanium ethoxide, the electrolyte additive further comprised 1,3-propanesultone (PS), a content of 1,3-propanesultone (PS) was 0.5% of a total weight of the electrolyte.

Example 16

The preparation process was the same as example 1, except that in the preparation of the positive electrode active material (step (4)), besides the titanium ethoxide, the electrolyte additive further comprised ethylene sulfate (DTD), a content of ethylene sulfate (DTD) was 0.5% of a total weight of the electrolyte.

Comparative Example 1

The preparation process was the same as example 1, except that in the preparation of the positive electrode active material (step (4)), there was no titanium ethoxide in the electrolyte.

Comparative Example 2

The preparation process was the same as example 1, except that in the preparation of the positive electrode active material (step (4)), the content of titanium ethoxide was 0.7% of a total weight of the electrolyte.

Comparative Example 3

The preparation process was the same as example 1, except that in the preparation of the positive electrode active material (step (4)), there was no titanium ethoxide in the electrolyte, the electrolyte additive was 4-Fluoro-1,3-dioxo-lan-2-one (FEC), a content of 4-Fluoro-1,3-dioxolan-2-one (FEC) was 0.5% of a total weight of the electrolyte.

Comparative Example 4

The preparation process was the same as example 1, except that in the preparation of the positive electrode active material (step (4)), there was no titanium ethoxide in the electrolyte, the electrolyte additive was ethylene carbonate (VC), a content of ethylene carbonate (VC) was 0.5% of a total weight of the electrolyte.

Comparative Example 5

The preparation process was the same as example 1, except that in the preparation of the positive electrode active material (step (4)), there was no titanium ethoxide in the electrolyte, electrolyte additive was 4-Vinyl-1,3-dioxolan-2-one (VEC), a content of 4-Vinyl-1,3-dioxolan-2-one (VEC) was 0.5% of a total weight of the electrolyte.

Comparative Example 6

The preparation process was the same as example 1, except that in the preparation of the positive electrode active material (step (4)), there was no titanium ethoxide in the electrolyte, the electrolyte additive was 1,3-propanesultone (PS), a content of 1,3-propanesultone (PS) was 0.5% of a total weight of the electrolyte.

Comparative Example 7

The preparation process was the same as example 1, except that in the preparation of the positive electrode active material (step (4)), there was no titanium ethoxide in the electrolyte, the electrolyte additive was ethylene sulfate (DTD), a content of ethylene sulfate (DTD) was 0.5% of a total weight of the electrolyte.

Comparative Example 8

The preparation process was the same as example 1, except that in the preparation of the positive electrode active material (step (1)), there was no $B_2O_3$ coating layer in the positive electrode active material.

Comparative Example 9

The preparation process was the same as example 1, except that in the preparation of the positive electrode active material (step (1)), the content of the $B_2O_3$ coating layer was 0.30% of a total weight of the core.

TABLE 1

Parameters of examples 1-16 and comparative examples 1-9

| | $B_2O_3$ Content of coating layer | Organic titanium compound Type | Content (%) | Other electrolyte additive Type | Content (%) |
|---|---|---|---|---|---|
| Example 1 | 0.10% | Titanium ethoxide | 0.1 | / | / |
| Example 2 | 0.10% | Butyl isopropyl titanate | 0.1 | / | / |
| Example 3 | 0.10% | Titanocene bis(trifluoromethane-sulfonate) | 0.1 | / | / |
| Example 4 | 0.10% | Tetrakis(dimethyl-amino)titanium | 0.1 | / | / |
| Example 5 | 0.10% | Titanium ethoxide | 0.001 | / | / |
| Example 6 | 0.10% | Titanium ethoxide | 0.01 | / | / |
| Example 7 | 0.10% | Titanium ethoxide | 0.2 | / | / |
| Example 8 | 0.10% | Titanium ethoxide | 0.5 | / | / |
| Example 9 | 0.01% | Titanium ethoxide | 0.1 | / | / |
| Example 10 | 0.02% | Titanium ethoxide | 0.1 | / | / |
| Example 11 | 0.20% | Titanium ethoxide | 0.1 | / | / |
| Example 12 | 0.10% | Titanium ethoxide | 0.1 | FEC | 0.5 |
| Example 13 | 0.10% | Titanium ethoxide | 0.1 | VC | 0.5 |
| Example 14 | 0.10% | Titanium ethoxide | 0.1 | VEC | 0.5 |
| Example 15 | 0.10% | Titanium ethoxide | 0.1 | PS | 0.5 |
| Example 16 | 0.10% | Titanium ethoxide | 0.1 | DTD | 0.5 |
| Comparative example 1 | 0.10% | / | / | / | / |
| Comparative example 2 | 0.10% | Titanium ethoxide | 0.7 | / | / |
| Comparative example 3 | 0.10% | / | / | FEC | 0.5 |
| Comparative example 4 | 0.10% | / | / | VC | 0.5 |
| Comparative example 5 | 0.10% | / | / | VEC | 0.5 |
| Comparative example 6 | 0.10% | / | / | PS | 0.5 |
| Comparative example 7 | 0.10% | / | / | DTD | 0.5 |
| Comparative example 8 | / | Titanium ethoxide | 0.1 | / | / |
| Comparative example 9 | 0.30% | Titanium ethoxide | 0.1 | / | / |

Finally, test processes of the lithium-ion batteries were described.

(1) Testing of High Temperature Cycle Performance of the Lithium-Ion Battery

At 45° C., the lithium-ion battery was charged to a voltage of 4.3V at a constant current of 1 C, then the lithium-ion battery was charged to a current of 0.05 C at a constant voltage of 4.3V, then the lithium-ion battery was discharged at a constant current of 1 C until the final voltage was 2.8V, this was a charge-discharge cycle, discharged capacity of first cycle was 100%, then the charge-discharge cycle was performed, discharged capacity of $200^{th}$ cycle was marked and capacity retention rate after $200^{th}$ cycle of the lithium-ion battery was calculated.

Capacity retention rate after $200^{th}$ cycle under 45° C. of the lithium-ion battery (%)=discharged capacity of $200^{th}$ cycle/discharged capacity of first cycle×100%.

(2) Testing of High Temperature Storage Performance of the Lithium-Ion Battery

At 25° C., the lithium-ion battery was charged to a voltage of 4.3V at a constant current of 1 C, then the lithium-ion battery was charged to a current of 0.05 C at a constant voltage of 4.3V, then the lithium-ion battery was discharged at a constant current of 1 C until the final voltage was 2.8V, discharged capacity of first cycle of the lithium-ion battery was marked as C1, then the lithium-ion battery was fully discharged to 4.3V at 1 C, after the lithium-ion battery being charged to 0.05 C at constant voltage, the fully discharged lithium-ion battery was stored in a thermostat for 90 days under 60° C., and the lithium-ion battery was taken out to test every 30 days, after the 90 days storage process was completed, the lithium-ion battery was taken out, then the lithium-ion battery was discharged to 2.8V, and charged to a voltage of 4.3V at a constant current of 1 C, then the lithium-ion battery was charged to a current of 0.05 C at a constant voltage of 4.3V, then the lithium-ion battery was discharged at a constant current of 1 C, until the final voltage was 2.8V, discharged capacity was marked as Cn.

Capacity retention rate after stored for 90 days under 60° C. of the lithium-ion battery=Cn/C1×100%.

TABLE 2

Testing results of examples 1-16 and comparative examples 1-9

|  | Capacity retention rate after $200^{th}$ cycle at 45° C. | Capacity retention rate after stored for 90 days under 60° C. |
| --- | --- | --- |
| Example 1 | 92.11% | 89.44% |
| Example 2 | 92.83% | 89.07% |
| Example 3 | 91.15% | 89.24% |
| Example 4 | 92.27% | 90.07% |
| Example 5 | 86.17% | 80.15% |
| Example 6 | 89.15% | 86.01% |
| Example 7 | 91.96% | 90.38% |
| Example 8 | 92.57% | 93.15% |
| Example 9 | 78.32% | 80.55% |
| Example 10 | 80.56% | 84.15% |
| Example 11 | 91.78% | 88.53% |
| Example 12 | 92.10% | 93.15% |
| Example 13 | 92.06% | 90.44% |
| Example 14 | 92.06% | 91.32% |
| Example 15 | 91.82% | 93.97% |
| Example 16 | 92.22% | 93.24% |
| Comparative example 1 | 78.05% | 75.32% |
| Comparative example 2 | 70.32% | 68.17% |
| Comparative example 3 | 85.14% | 78.68% |
| Comparative example 4 | 84.70% | 78.69% |
| Comparative example 5 | 81.34% | 76.41% |
| Comparative example 6 | 79.76% | 77.47% |
| Comparative example 7 | 80.46% | 77.70% |
| Comparative example 8 | 74.56% | 73.13% |
| Comparative example 9 | 83.43% | 85.07% |

It could be seen from table 1 and table 2, in examples 1-8 and comparative example 1, the lithium-ion battery with organic titanium compound as the electrolyte additive of electrolyte had better high temperature cycle capacity retention rate and high temperature storage capacity retention rate, and the organic titanium compound with different structures could make the lithium-ion battery have better high temperature cycle capacity retention rate and high temperature storage capacity retention rate, which indicated that electrochemical deposition of the organic titanium compound would occur effectively on the surface of the positive electrode during cycle process of the lithium-ion battery, so as to make the lithium-ion battery has excellent cycle performance and excellent storage performance. Even though when the content of the organic titanium compound was only 0.001% (example 5), compared with comparative example 1 in which there was no organic titanium compound as the electrolyte additive, capacity retention rate after $200^{th}$ cycle of the lithium-ion battery was still promoted about 8%, it could be speculated that electrochemical deposition of the organic titanium compound could effectively occur on the surface of the positive electrode and the effect of passivating the surface of the positive electrode was obviously, as the content of the organic titanium compound of the electrolyte increased (examples 9-11), and the high temperature cycle performance and the high temperature storage performance of the lithium-ion battery could be further improved, when the content of the organic titanium compound of the electrolyte increased to 0.2%, the improvement of the cycle performance of the lithium-ion battery was no longer obvious.

In example 1, examples 9-11 and comparative examples 8-9, the positive electrode active material without $B_2O_3$ coating layer was unable to resist corrosion of the electrolyte due to the lack of stabilizing effect of boron on the core, dissolving-out of transition metal of the core would occur, the high temperature cycle capacity retention rate and the high temperature storage capacity retention rate of the lithium-ion battery would be decreased rapidly. If the $B_2O_3$ coating layer was too thick, even though reactions between the electrolyte and the positive electrode active material could be inhibited, more and more lithium ions could not be successfully intercalated and deintercalated due to too high resistance, so as to significantly decrease the high temperature cycle capacity retention rate and the high temperature storage capacity retention rate of the lithium-ion battery.

In examples 12-16 and comparative examples 3-7, when the organic titanium compound was used in a combination with FEC, VC, VEC, PS or DTD, passivation film could be formed on the negative electrode plate due to FEC, VC, VEC, PS or DTD, damage to the negative electrode plate caused by the reaction side-product of the organic titanium compound could be inhibited, thereby the cycle performance and the storage performance of the lithium-ion battery could be further improved, if only FEC, VC, VEC, PS or DTD was used as the electrolyte additive, the high temperature cycle performance and the high temperature storage performance of the lithium-ion battery could not be improved.

In conclusion, the coating layer of the positive electrode active material of the lithium-ion battery according to the present disclosure contained boron, and the electrolyte of the lithium-ion battery contained the organic titanium compound, under the combined effect of the coating layer containing boron and the electrolyte containing the organic titanium compound, the lithium-ion battery had excellent high temperature cycle performance and excellent high temperature storage performance.

The invention claimed is:

1. A lithium-ion battery, comprising:
   a positive electrode plate containing a positive electrode active material;
   a negative electrode plate containing a negative electrode active material; and
   an electrolyte;
   wherein
   the positive electrode active material comprises: a core; and a coating layer coating a surface of the core and comprising boron;
   the electrolyte comprises a lithium salt, a non-aqueous organic solvent and an electrolyte additive, the electrolyte additive comprises an organic titanium compound, the organic titanium compound is one or more selected from the group consisting of compounds represented by formula 1, formula 2, formula 3, formula 4 and formula 5;

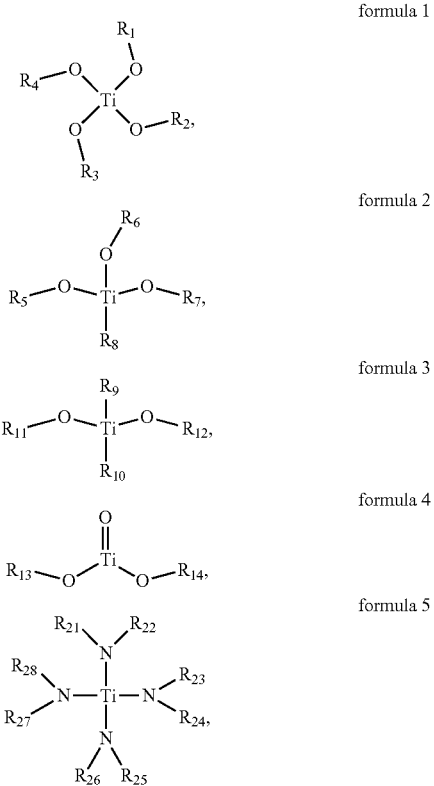

where,
$R_1$, $R_2$, $R_3$, $R_4$, $R_5$, $R_6$, $R_7$, $R_{11}$, $R_{12}$, $R_{13}$ and $R_{14}$ each independently are one selected from C1~C12 alkyl group substituted or unsubstituted with one or more substituent group, C1~C12 hydroxyalkyl group substituted or unsubstituted with one or more substituent group, C2~C12 alkenyl group substituted or unsubstituted with one or more substituent group, C2~C12 alkynyl group substituted or unsubstituted with one or more substituent group, C1~C12 sulfonyl substituted or unsubstituted with one or more substituent group, and metal ion;

$R_8$, $R_9$ and $R_{10}$ each independently are one selected from C1~C12 alkyl group substituted or unsubstituted with one or more substituent group, C2~C12 alkenyl group substituted or unsubstituted with one or more substituent group, C2~C12 alkynyl group substituted or unsubstituted with one or more substituent group, and halogen;

$R_{21}$, $R_{22}$, $R_{23}$, $R_{24}$, $R_{25}$, $R_{26}$, $R_{27}$ and $R_{28}$ each independently are one selected from C1~C6 alkyl group substituted or unsubstituted with one or more substituent group and C1~C6 sulfonyl substituted or unsubstituted with one or more substituent group; and the core is one or more selected from the group consisting of lithium nickel cobalt manganese oxide, lithium nickel cobalt aluminium oxide and compounds obtained by adding transition metal element or non-transition metal element to the above oxides wherein a content of the organic titanium compound is 0.001%~0.5% of a total weight of the electrolyte.

2. The lithium-ion battery according to claim 1, wherein the substituent group is one or more selected from a group consisting of halogen atom and oxygen atom.

3. The lithium-ion battery according to claim 1, wherein the core is lithium nickel cobalt manganese metal oxide.

4. The lithium-ion battery according to claim 3, wherein the core is one or more selected from the group consisting of $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$ and $LiNi_{0.8}Mn_{0.1}O_2$.

5. The lithium-ion battery according to claim 1, wherein the core of the positive electrode active material includes a large particle core and a small particle core, a particle size of the large particle core ranges from 10 μm to 14 μm, a particle size of the small particle core ranges from 3 μm to 6 μm.

6. The lithium-ion battery according to claim 5, wherein in the core of the positive electrode active material, a weight ratio of the large particle core and the small particle core is (5~9):(1~5).

7. The lithium-ion battery according to claim 6, wherein a content of nickel of the large particle core is greater than or equal to a content of nickel of the small particle core.

8. The lithium-ion battery according to claim 7, wherein the content of nickel of the large particle core is greater than the content of nickel of the small particle core.

9. The lithium-ion battery according to claim 1, wherein the coating layer is selected from $B_2O_3$.

10. The lithium-ion battery according to claim 1, wherein a content of the coating layer is 0.01%~0.2% of a total weight of the core.

11. The lithium-ion battery according to claim 10, wherein the content of the coating layer is 0.02%~0.1% of the total weight of the core.

12. The lithium-ion battery according to claim 1, wherein the organic titanium compound is one or more selected from a group consisting of tetrabutyl titanate, titanium ethoxide, titanium propoxide, titanium diisopropoxide bis(acetylacetonate), titanium tetraisopropanolate, tetra-tert-butyl orthotitanate, butyl isopropyl titanate, titanium isobutoxide, tetra (3-hydroxypropoxy) titanate, titanium(IV)oxide acetylacetonate, tetrakis(2,4-pentanedionato)titanium(IV), titanocene bis(trifluoromethanesulfonate), dichlorotitanium diisopropoxide, titanium dichloride diethoxide, iodotriisopropyl titanate and tetraki s(dim ethyl amino)titanium.

13. The lithium-ion battery according to claim 12, wherein the content of the organic titanium compound is 0.001%~0.1% of the total weight of the electrolyte.

14. The lithium-ion battery according to claim 1, wherein the electrolyte additive further comprises one or more selected from a group consisting of maleic anhydride, vinylene carbonate, 4-Vinyl-1,3-dioxolan-2-one, 4-Fluoro-1,3-dioxolan-2-one, γ-butyrolactone, dimethyl sulfite, diethyl sulfite, glycol sulfite, propyl sulfite, vinylidene sulfite, sulfolane, cyclopentyl sulfone, tetramethylene sulfoxide, cyclopentyl sulfoxide, dimethyl sulfoxide, methyl ethyl sulfoxide, diethyl sulfoxide, methyl sulfone, methyl ethyl sulfone, diethyl sulfone, divinyl sulphone, methyl methanesulfonate, ethyl methanesulfonate, propargyl methanesulfonate, methyl benzenesulfonate, 1,3-propanesultone, 1,4-butane sultone, dimethyl sulfate, diethyl sulfate, ethylene sulfate, 1,2-propanediol sulfate and prop-1-ene-1, 3-sultone.

* * * * *